Figure 1:
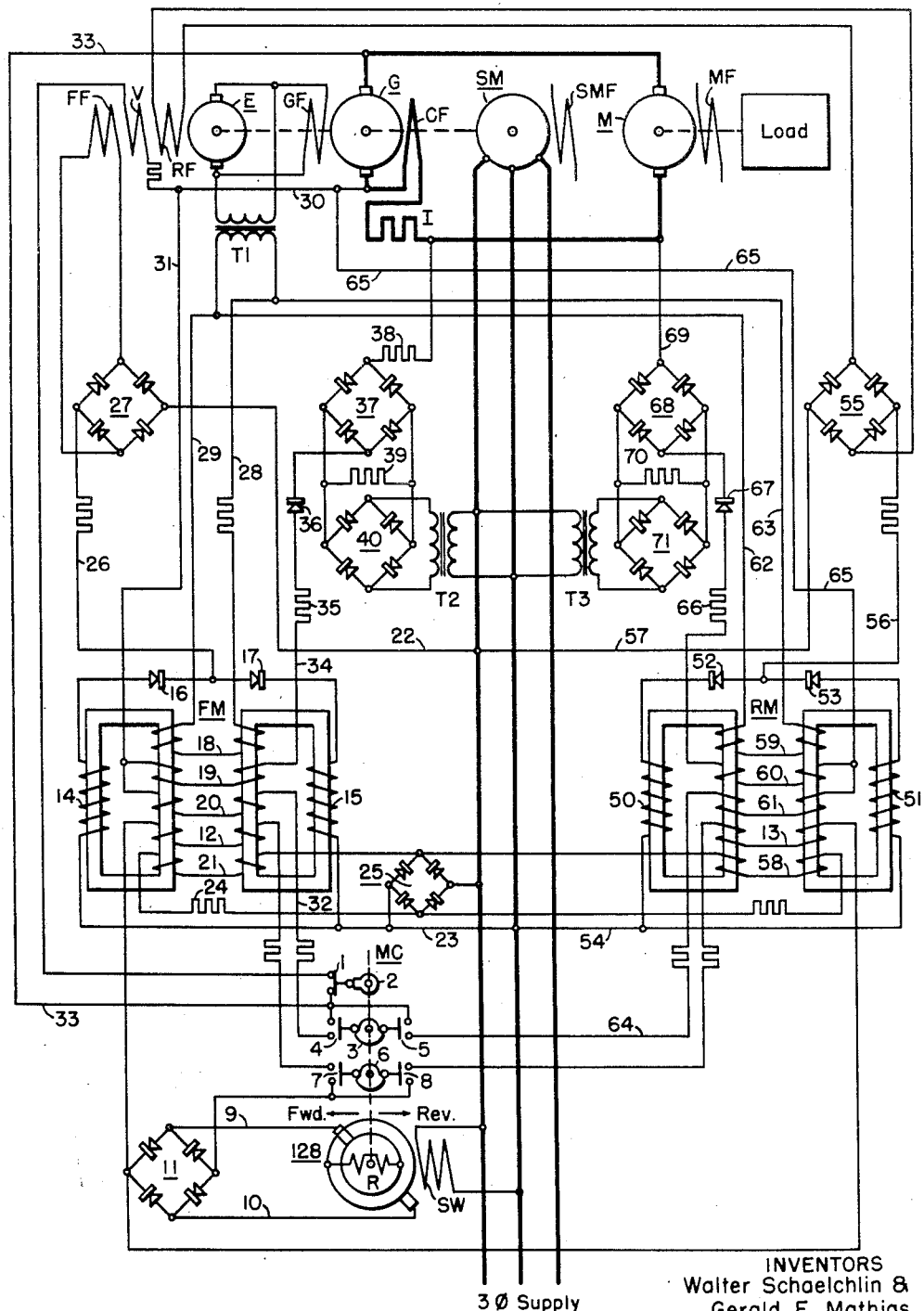

March 12, 1957    W. SCHAELCHLIN ET AL    2,785,361

STEPLESS CONTROL FOR WARD LEONARD SYSTEM

Filed Jan. 25, 1954    2 Sheets-Sheet 1

3 Ø Supply

INVENTORS
Walter Schaelchlin &
Gerald E. Mathias.
BY
Paul E. Friedemann
ATTORNEY United States Patent Office 2,785,361
Patented Mar. 12, 1957

2,785,361

STEPLESS CONTROL FOR WARD LEONARD SYSTEM

Walter Schaelchlin, Buffalo, and Gerald E. Mathias, Williamsville, N. Y., assignors to Westinghouse Electric Corporation, East Pittsburgh, Pa., a corporation of Pennsylvania Application January 25, 1954, Serial No. 405,800

20 Claims. (Cl. 318—143)

This invention relates generally to means of controlling electric systems and more particularly to means for producing a smooth stepless control of an electrical system over a wide range.

Large shovels and dragline earth moving and excavating machines generally have individual motor-generator sets for supplying energy to the load operating motor. For practical purposes, the motor-generator set is usually located on the shovel. The motor of the motor-generator then receives its power from a portable, or temporary substation through a trailing cable which must of necessity be of an appreciable length. The regulation of such a supply system is only fair at best and, therefore, difficulty is had in keeping a high demand of power from causing the line voltage from dropping to the extent that the driving motor for the motor-generator set pulls out of step and shuts the motor-generator set down. The use of synchronous motors for the driving motor of the motor-generator sets allows some power factor correction by overexcitation of the field windings. Even so, a major problem is still to make the maximum percentage of the power from the motor-generator set drive available for productive effort.

The drives for shovels, draglines and other equipment of the type contemplated here must respond quickly but smoothly to the operator's control. Sluggishness cannot be tolerated, nor can surges or violent changes which produce unnecessary stress on the mechanical system. As a consequence, the desideratum is to have a drive system which provides stepless control.

Prior art controllers which have been designed to meet the operational specifications of heavy-duty applications such as the systems contemplated here have been made large and cumbersome and are not stepless. Such controllers take up too much room on control desks and panelboards and cause surges in the electrical drive system with resultant stress on the mechanical system.

It is, therefore, the general object of this invention to provide control means for an electrical drive.

An object of this invention is to provide a stepless electrical control for an electrical drive system.

Another object of this invention is to provide simple, rugged, positive action apparatus for giving a stepless electrical control to an electric drive.

A further object of this invention is to provide a current limit control in a system of the character referred to.

Still a further object of this invention is to provide an electrical control system for electrical drives which is simple, positive in operation, and avoids system surges.

Figure 2:
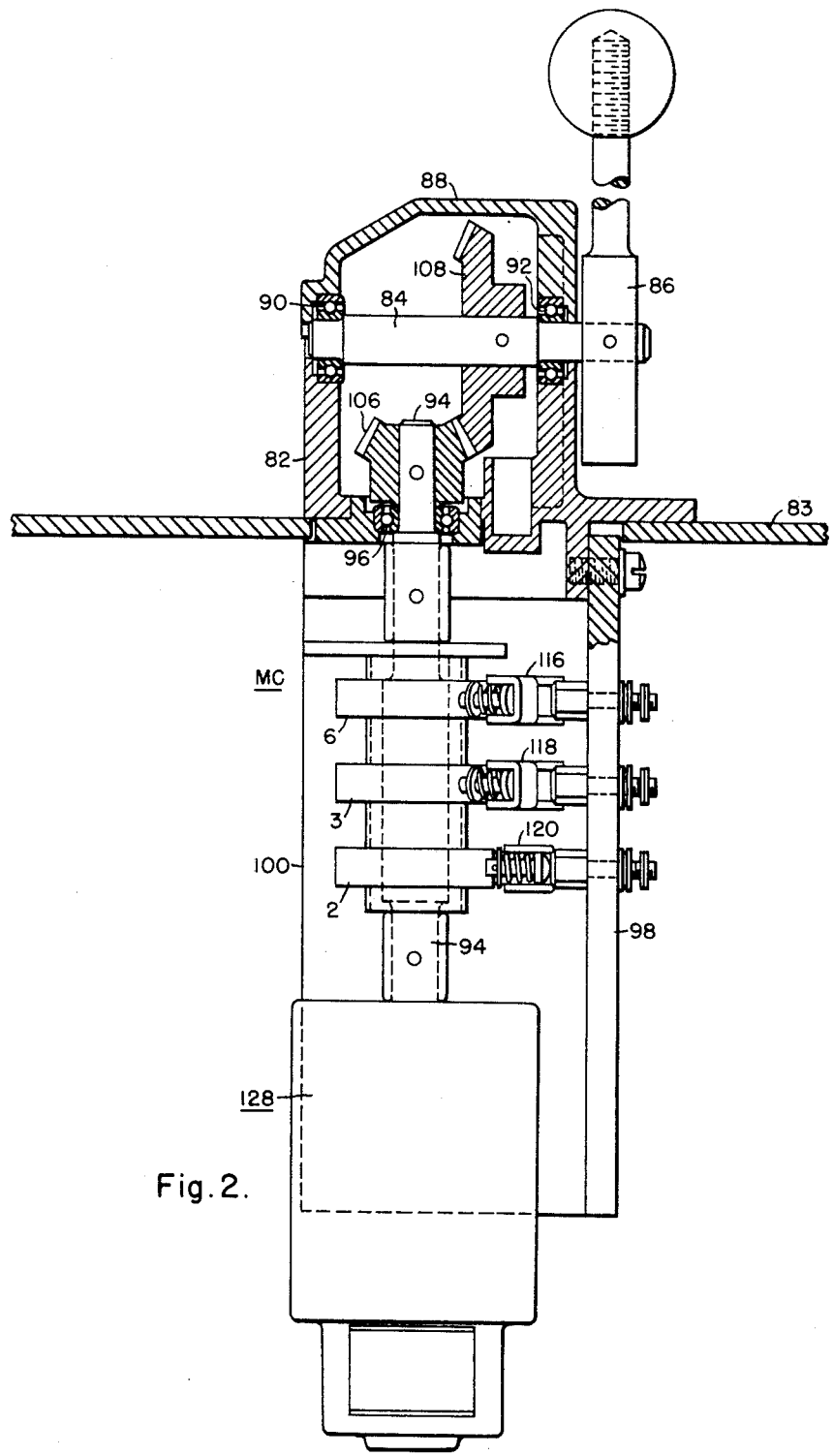

The objects stated are merely illustrative. Still other objects and advantages will become apparent from a study of the following specification and drawings, in which:

Figure 1 shows diagrammatically the circuit and mechanical components of the invention; and Fig. 2 shows a view which is cross-sectional in part of the stepless controller of the invention.

In Fig. 1, the main motor M is shown coupled to a suitable load and has its armature connected in a loop circuit with main generator G. The main generator G has its field winding GF supplied by an exciter generator E. The main generator G and the exciter generator E are driven at a constant speed by the synchronous motor SM which has its armature winding connected to the alternating current supply and its field winding SMF connected through suitable control apparatus to a source of direct current. The motor field winding MF is also connected through a suitable control to the source of direct current. The excitation means for the exciter generator E consists of a voltage killer field winding V, a forward pattern field winding FF and a reverse pattern field winding RF.

The voltage killer field winding V is connected directly across the armature terminals of the main generator G through the contacts 1 of the master controller MC when the master controller MC is in its neutral position. The contacts 1 are operated by the cam 2 on the master controller MC. Thus, it may be seen that when the master controller MC is moved to either a forward or a reverse direction as indicated, the voltage killer field V is disconnected from the system, but when the master controller MC is returned to a neutral position, the voltage killer field V is connected directly across the armature of the main generator G and thus is energized by the voltage across the main generator (either residual or a voltage generated by the motor if it should overrun).

The voltage killer field V is wound in such a manner as to reduce the excitation of the exciter generator E when the master controller MC is returned to the neutral position and, consequently, to reduce the excitation of the field winding GF of the main generator G so that the motor M is stopped immediately. Also, if the load should attempt to drive the motor M, it would generate a voltage which would appear across the voltage killer field V and this voltage would cause the exciter generator E to excite the main generator G so that it would generate a voltage of opposite polarity to that generated by the motor M. Thus, regenerative braking is effected to maintain the load in the desired position.

The master controller MC also has a cam 3 which operates the contacts 4 and 5 and a cam 6 which operates contacts 7 and 8, and an inductor which has a stator winding SW and a rotor winding R which is adapted to be rotated with respect to the stator winding SW. The rotor is provided with slip rings so that the voltage induced in the rotor may be brought out in the leads 9 and 10. The rotor poles are displaced 90 degrees to the primary flux when the master switch is in the off position so that no voltage is induced in the rotor R even though the stator winding SW has a continuous constant potential alternating current excitation. If the master controller MC is moved in either direction from the off position, the magnetic coupling between the rotor R and the stator winding SW is increased and a voltage is induced in the rotor winding R which has a magnitude proportional to the sine of the angle of the angular displacement of the rotor winding R. The resultant voltage is infinitely variable over the finite range from zero to the maximum established by the particular inductor design.

The output of the inductor is connected to the input terminals of the full-wave bridge rectifier 11 by the leads 9 and 10. The output terminals of the full-wave bridge rectifier 11 are utilized to supply the pattern voltage selected by the position of the master controller MC to the pattern field windings 12 and 13 of the forward and reverse magnetic amplifiers FM and RM, respectively. The pattern field windings 12 and 13 on the two magnetic amplifiers FM and RM are arranged to be selectively energized in dependence upon the direction of rotation of the master controller MC. For example, if the master controller MC is rotated in a forward or clockwise direction as indicated, the cam 6 will cause the contacts 7 to close and complete a circuit from the left output terminals of the full-wave bridge rectifier 11 through the pattern field 12 of the forward magnetic amplifier FM and through the contacts 7 to the right-hand output terminal of the full-wave bridge rectifier 11. If the master controller MC is rotated in the reverse or counter-clockwise direction as indicated, the pattern winding 13 of the reverse magnetic amplifier RM will be connected across the output terminals of the full-wave bridge rectifier 11 through the contacts 8.

The forward magnetic amplifier FM also has main windings 14 and 15 each connected in series with saturating rectifiers 16 and 17, respectively, and the two circuits are connected in parallel. The forward magnetic amplifier has a damping winding 18 and a current limit control winding 19, a voltage control winding 20 and a biasing winding 21. The saturating rectifiers 16 and 17 are poled such that the main windings 14 and 15 conduct on alternate half cycles when connected across a source of alternating current supply. A lead 23 connects one line of a three-phase supply to a point between the main windings 14 and 15 of the forward magnetic amplifier FM. The point between the two saturating rectifiers 16 and 17 is connected by the lead 26 to one input terminal of the full-wave bridge rectifier 27, and the opposite input terminal of the full-wave bridge rectifier 27 is connected to a second lead of the three-phase supply by line 22.

The biasing winding 21 of the forward magnetic amplifier FM is connected in series with a resistor 24 across the output terminals of a full-wave bridge rectifier 25 which has its input terminals connected across two leads of the three-phase supply. The resistance value of resistor 24 and the turns of the winding 21, with respect to the effective voltage on this winding 21, are so selected that the forward magnetic amplifier FM normally operates at cutoff. It has already been discussed how the pattern field 12 is energized when the master controller is rotated in the forward direction. When a pattern voltage is applied across the pattern control winding 12 of the forward magnetic amplifier FM, the cores on the magnetic amplifier are driven toward saturation.

When the forward magnetic amplifier FM becomes conductive, its output appears across the input terminals of the full-wave bridge rectifier 27. The output terminal of the full-wave bridge rectifier 27 is connected directly across the forward field winding FF of the exciter generator E, and thus excites the exciter generator in accordance with the relative positions of the rotor R and the stator winding SW of the inductor on the master controller MC. The exciter generator E determines the excitation of the generator field winding GF for the main generator G, and, consequently, the output of the generator G. Under the conditions just described, the motor M is caused to rotate in the "forward" direction at the rate selected by the master controller MC.

A rate of change signal is fed back from the exciter generator E through the transformer T1 and leads 28 and 29 to the damping windings 18 of the forward magnetic amplifier FM. The damping windings 18 are provided for the purpose of stabilizing the system. The forward magnetic amplifier FM is made voltage regulating by providing the voltage control winding 20 and connecting it across the output of the main generator G. The circuit of the voltage control winding 20 comprises the armature of the main generator G, leads 30 and 31, the voltage control winding 20, lead 32, the contacts 4 of the master controller MC, and the lead 33. Thus, a signal is applied to the voltage control winding 20 of the forward magnetic amplifier FM which is determined by the output voltage of the main generator G to provide a voltage regulating system.

In addition to acting as control means for forward rotation of the motor M, the forward magnetic amplifier acts as a current limit regulator when the motor is being operated in the reverse direction. The current limit control winding 19 is provided for this purpose. Current limit control winding 19 is connected across the commutator field CF of the main generator G and impedance I in the loop circuit of the armature of the motor M. The circuit of the current limit control winding 19 comprises the terminal of the commutating field CF which is adjacent the armature of the main generator G, leads 30 and 31, the current limit control winding 19, lead 34, limiting resistor 35, blocking rectifier 36, one input terminal of the full-wave bridge rectifier 37, the opposite input terminal of the full-wave bridge rectifier 37, limiting resistor 38, the impedance I and the commutator field CF of the main generator G. The output terminals of the full-wave bridge rectifier 37 are connected across a load resistor 39 and the output terminals of the full-wave bridge rectifier 40. The input terminals of the full-wave bridge rectifier 40 are supplied from a transformer T2 having its input terminals connected across two leads of a three-phase supply.

It will be seen that the voltage across the commutating field CF of the main generator G and the impedance I in the motor generator loop circuit must exceed the voltage across the load resistor 39 of the full-wave bridge rectifier 40 before current will flow in the circuit of the current limit control winding 19. Thus, the current limit value is set by the voltage which appears across the load resistor 39 of the full-wave bridge rectifier 40. It will also be seen that the blocking rectifier 36 in the circuit of the current limit control winding 19 polarizes the circuit such that the current limit control winding 19 is only effective for a current in excess of the preselected value for reverse operation of the motor M. If the current in the armature circuit of the motor M exceeds the preselected amount when the motor M is being operated in its reverse direction, the current in the current limit control winding 19 will cause the forward magnetic amplifier FM to energize the forward field winding FF of the exciter generator E. The forward field winding FF of the exciter generator E acts to oppose the effect of the reverse field winding RF and thereby reduces the overall excitation of the exciter generator E. Thus, the excitation of the main generator G is reduced and the current in the armature circuit of the motor M is limited.

For operation of the motor in the reverse direction, the same master controller MC is utilized and a similar circuit is employed which has components which correspond to components of the forward regulating control circuit. It has already been pointed out that a reverse magnetic amplifier RM is provided with a pattern control winding 13 which is energized when the master controller MC is rotated in the reverse direction as indicated, and that the magnitude of the signal to the pattern control winding 13 is determined by the relative positions of the rotor winding R and the stator winding SW of the master controller MC.

The reverse magnetic amplifier RM has main windings 50 and 51 connected in series with the saturating rectifiers 52 and 53, respectively, and the two series circuits are connected in parallel with each other. A terminal between the two main windings 50 and 51 is connected by the lead 54 to one lead of the three-phase supply, and a terminal intermediate the two saturating rectifiers 52 and 53 is connected to one input terminal of a full-wave bridge rectifier 55 by the lead 56. The opposite input terminal of the full-wave bridge rectifier 55 is connected by means of the lead 57 to another line of the three-phase supply. Thus, the output voltage of the reverse magnetic amplifier RM appears across the output terminal of the full-wave bridge rectifier 55. The output terminals of the full-wave bridge rectifier 55 are connected directly across the reverse field winding RF of the exciter generator E so that the output of the reverse magnetic amplifier RM will determine the excitation of the exciter generator E, and, consequently, the excitation of the main generator G when the master controller MC is in the reverse position. The saturating rectifiers 52 and 53 are poled in such a manner that the main windings 50 and 51 of the reverse magnetic amplifier RM conduct on alternate half cycles of the supply voltage.

The operating point of the reverse magnetic amplifier RM is determined by the voltage on the biasing winding 58 which is connected across the output terminals of the full-wave bridge rectifier 25. The reverse magnetic amplifier RM is also operated at cutoff.

The reverse magnetic amplifier RM also has a damping winding 59, a current limit control winding 60 and a voltage control winding 61. The damping winding 59 of the reverse magnetic amplifier RM is connected by leads 62 and 63 to the output terminals of the transformer T1 so that the damping windings 59 receive a signal proportional to the rate of change of the output voltage of the exciter generator E. The damping windings 59 are provided to stabilize the system for reverse operation. The voltage control windings 61 are connected to receive the output voltage of the main generator G, and, thus, provide voltage regulation for the reverse magnetic amplifier RM. The circuit of the voltage control winding 61 comprises the armature of the main generator G, lead 33, contacts 5 of the master controller MC, lead 64, voltage control winding 61 and lead 65 to the lower terminal of the armature of the main generator G.

The current limit control winding 60 of the reverse magnetic amplifier RM is connected across the commutator field CF and the impedance I in the loop of the motor armature circuit in order to limit the current in the motor generator loop for forward operation of the motor as the forward magnetic amplifier FM limits the current for reverse operation of the motor M. The circuit comprises the lower terminal of the armature of the main generator G, lead 65, current limit control winding 60, limiting resistor 66, blocking rectifier 67, one input terminal of the full-wave bridge rectifier 68, the opposite input terminal of the full-wave bridge terminal 68, lead 69, the impedance I and the commutator field CF of the main generator G. The blocking rectifier 67 polarizes its circuit such that only a current resulting from forward operation of the motor can flow.

The output terminals of the full-wave bridge rectifier 68 are connected across the load resistor 70 of the full-wave bridge rectifier 71. The input terminals of the full-wave bridge rectifier 71 are supplied from the transformer T3, the primary of which is connected across two leads of the three-phase supply. It may be readily seen that since the current in the loop of the current limit control windings 60 for the reverse magnetic amplifier RM must flow through the load resistors 70 of the full-wave bridge rectifier 71, the voltage across the commutator field CF and the impedance I in the motor generator loop must exceed the voltage across the load resistor 70 of the full-wave bridge rectifier 71 before current will flow in the loop. In other words, the voltage across the load resistor 70 of the full-wave bridge rectifier 71 predetermines the current limit value for forward operation of the motor M. If the current in the armature circuit of the motor M exceeds the predetermined amount when the motor M is being operated in its forward direction, the current in the current limit control winding 60 will cause the reverse magnetic amplifier RM to energize the reverse field winding RF of the exciter generator E. The reverse field winding RF of the exciter generator E acts to oppose the effect of the forward field winding FF and thereby reduces the overall excitation of the exciter generator E. As a consequence, the excitation of the main generator G is reduced and the current in the armature circuit M is limited to the preselected amount.

It will be appreciated from the foregoing discussion that the system just described provides an accurate, stepless, reversible control means with voltage regulation and current limit for the motor M.

The master controller MC which is important in obtaining the stepless control is shown in more detail in Fig. 2. The diagram of Fig. 2 shows the switch completely assembled with a section through a portion on the switch. A base member 82 provides a means of support for the shaft 84 for the operating lever 86. A housing or cover 88 is provided which coacts with the base 82 to support the bearings 90 and 92 for the operating shaft 84 and to form a cover for the base member 82. The base member 82 and the housing 88 are preferably diecast of a heavy material for ruggedness. The base member 82 is adapted to fit on a horizontal control panel or control desk 83 in such a manner that the switching devices, inductor, and connections are all beneath the desk surface to give a modern, clean-cut appearance and also for reasons of safety.

Another rotatable shaft 94 is supported in the base member 82 and is provided with bearings 96. Supporting sides 98 and 100 are attached to the base member 82 in a suitable manner. At the end of the rotatable shaft 94, which protrudes into the base member 82, a bevel gear 106 is fixed to the shaft 94 and meshes with a mating actuated bevelled gear 108 fixed to the actuating shaft 84 so that rotation of the actuating lever 86 causes the operating shaft 84 to rotate, and, hence, the operating or actuating bevelled gear 108. The rotary motion is transmitted through the bevelled gear 106 to the rotatable shaft 94, and, thus, the arcuate motion of the actuating lever 86 is translated into rotary motion about an axis perpendicular to the axis of rotation of the actuating lever 86. The relative sizes and number of teeth on the bevel gears 106 and 108 is so selected as to give the desired number of degrees of rotation for the shaft 94 for a given number of degrees of arcuate movement of the actuating lever 86.

The rotatable shaft 94 has cam members 2, 3 and 6 which correspond to the cam members 2, 3 and 6 shown in Fig. 1. Cam members 2, 3, and 6 are fixed to the rotatable shaft 94 in a suitable manner. The cam members 2, 3 and 6 are for the purpose of actuating the switch actuating arms 116, 118 and 120, respectively. The arms 116, 118 and 120 operate the contact members 1, 4, 5, 7 and 8 shown in Fig. 1. The stationary terminals are supported on the side piece 98 which is made of insulating material. In addition to the switch operating cams 2, 3 and 6, the inductor 128 is fixed to the end of the shaft 94 so that rotation of the shaft 94 determines the relative position of the rotor winding R with reference to the stator winding SW of the inductor.

Even though it is believed the operation of the master controller MC will be apparent from the foregoing description, a brief review for purposes of summary and information will be most helpful. The operator, when he desires to change the relative positions of the rotor windings R and the stator windings SW of the inductor 128 and also the position of the arms 116, 118 and 120, simply moves the actuating lever 86 either away from himself or toward himself, which movement through shaft 84 and gears 108 and 106 causes the shaft 94 to rotate. Rotation of the shaft 94 causes the cams 2, 3 and 6 to rotate and actuate the arms 116, 118 and 120 through their rollers riding along the periphery of the cams 2, 3 and 6 respectively. This operation determines the condition of the contact members 1, 4, 5, 7 and 8 (shown in Fig. 1). The rotor of the inductor 128 is coupled directly to the shaft 94 and, therefore, rotation of the shaft 94 will cause the relative positions of the rotor winding R and stator winding SW to be changed. The D.-C. output at rectifier 11 may thus be changed so as to be stepless from zero to a maximum and back to zero.

It will be recognized that the objects of this invention have been accomplished by providing a system which will respond quickly but very smoothly to the operator's control, and which utilizes a higher average power from the drive for productive effort than was possible with prior art controls of the nature described here. While in accordance with the patent statutes one best known embodiment of the invention is described in detail, it is to be particularly understood that the invention is not limited thereto or thereby, but that other equivalents are clearly within the scope of the invention.

We claim as our invention:

1. A system of control for an electrical drive comprising, a motor, a main generator having its armature winding connected in loop circuit with said motor, excitation means for said main generator, controller means, first and second individual amplifying channels, said first and second amplifying channels being selectively rendered conductive in accordance with the position of the controller to cause the excitation means of said generator to be energized in accordance with the output of the conducting amplifying channel, means to determine the output of the conducting amplifying channel in accordance with the voltage of the main generator, and the position of said controller means and means to render the other amplifying channel conductive in response to and by an amount determined by the current above a preselected value in the armature circuit of said motor to alter the energization of said excitation means.

2. A system of control for an electrical drive comprising, a motor, a main generator having its armature winding connected in loop circuit with said motor, excitation means for said main generator, controller means, first and second individual amplifying channels, said first and second magnetic amplifier channels being selectively rendered conductive in accordance with the position of the controller to cause the excitation means of said generator to be energized in accordance with the output of the conducting magnetic amplifier channel, means to determine the output of the conducting magnetic amplifier channel in accordance with the voltage of the main generator, and the position of said controller means and means to render the other magnetic amplifier channel conductive in response to and by an amount determined by the current above a preselected value in the armature circuit of said motor to alter the energization of said excitation means.

3. In a control system for an electric drive, the combination of a motor, a main generator having its armature winding connected in loop circuit with said motor, excitation means for said main generator, an exciter generator connected to determine the magnitude and sense of the excitation of the excitation means for the main generator, excitation means for said exciter generator, controller means, and means for determining the magnitude of the excitation of the excitation means for said exciter generator in accordance with the main generator voltage, a reference signal, and the current above a preselected value in the motor armature circuit, and to determine the sense of the excitation of the excitation means for said main generator in accordance with the position of said controller means.

4. In a control system for an electric drive, the combination of a motor, a main generator having its armature winding connected in loop circuit with said motor, excitation means for said main generator, an exciter generator connected to determine the magnitude and sense of the excitation of the excitation means for the main generator, excitation means for said exciter generator, controller means, first and second individual magnetic amplifier channels, said first and second magnetic amplifier channels being selectively rendered conductive in accordance with the position of the controller means to cause the excitation means of said exciter generator to be energized in accordance with the output of the conducting magnetic amplifier channel, means to determine the output of the conducting magnetic amplifier channel in accordance with the voltage of the main generator, and the position of said controller means and means to render the other magnetic amplifier channel conductive in response to and by an amount determined by the current above a preselected value in the armature circuit of said motor to alter the energization of the excitation means of said exciter generator.

5. A system of control for an electrical drive comprising, a motor, a main generator having its armature winding connected in loop circuit with said motor, excitation means for said main generator, controller means; first and second individual amplifying channels, said first and second individual amplifying channels each comprising at least one individual magnetic amplifier, each of said individual magnetic amplifiers having individual main windings, individual reference control windings, individual voltage control windings and individual current limit control windings, said individual main windings being connected to receive a supply voltage, said individual voltage control windings being connected to receive a voltage which is a function of the main generator voltage, said individual current limit control windings being connected to be energized in accordance with the current in said motor armature above a preselected magnitude, and said individual reference control windings being adapted to be selectively energized in accordance with the position of said controller to cause the magnetic amplifier channels to be selectively conductive and the excitation means of said generator to be energized in accordance with the output of the conducting magnetic amplifier channel.

6. In a control system for an electric drive, the combination of a motor, a main generator having its armature winding connected in loop circuit with said motor, excitation means for said main generator, an exciter generator connected to determine the magnitude and sense of the excitation of the excitation means for the main generator, excitation means for said exciter generator, controller means; first and second individual amplifying channels, said first and second individual amplifying channels each comprising at least one individual magnetic amplifier, each of said individual magnetic amplifiers having individual main windings, individual reference control windings, individual voltage control windings and individual current limit control windings, said individual main windings being connected to receive a supply voltage, said individual voltage control windings being connected to receive a voltage which is a function of the main generator voltage, said individual current limit control winding being connected to be energized in accordance with the current in said motor armature above a preselected magnitude, and said individual reference control windings being adapted to be selectively energized in accordance with the position of said controller to cause the magnetic amplifier channels to be selectively conductive and the excitation means of said exciter generator to be energized in accordance with the output of the conducting magnetic amplifier channel.

7. In a control system for an electric drive, the combination of a motor, a main generator having its armature winding connected in loop circuit with said motor, excitation means for said main generator, an exciter generator connected to determine the magnitude and sense of the excitation of the excitation means for the main generator, first, second and third excitation means for said exciter generator, controller means; and first and second individual magnetic amplifier channels, said first magnetic amplifier channel having its output connected to determine the excitation of said first excitation means, said second magnetic amplifier channel being connected to determine the excitation of said second excitation means, said first and second magnetic amplifier channels being connected to be selectively rendered conductive in accordance with the position of the controller means, means to determine the output of the conducting magnetic amplifier channel in accordance with the voltage of the main generator, and the position of said controller means and means to render the other magnetic amplifier channel conductive in response to and by an amount determined by the current above a preselected value in the armature circuit of said motor to alter the energization of the excitation means of said exciter generator; said third excitation means being connected to receive an excitation determined by the voltage across the main generator when said controller is in a position to render both of said magnetic amplifiers non-conductive.

8. In a control system for an electric drive, the combination of a motor, a main generator having its armature winding connected in loop circuit with said motor, excitation means for said main generator, an exciter generator connected to determine the magnitude and sense of the excitation of the excitation means for the main generator, first, second, and third excitation means for said exciter generator; controller means; and first and second individual amplifying channels, said first and second individual amplifying channels each comprising at least one individual magnetic amplifier, each of said individual magnetic amplifiers having individual main windings, individual reference control windings, individual voltage control windings and individual current limit control windings, said individual main windings being connected to receive a supply voltage, said individual voltage control windings being connected to receive a voltage which is a function of the main generator voltage, said individual current limit control windings being connected to be energized in accordance with the current in said motor armature above a preselected magnitude, and said individual reference control windings being adapted to be selectively energized in accordance with the position of said controller to cause the magnetic amplifier channels to be selectively conductive, said first and second excitation means being connected to receive the output of said first and second amplifying channels respectively, and said third excitation means being connected to receive an excitation which is determined by the voltage across the main generator when said controller is in a position to render both of said magnetic amplifiers non-conductive.

9. A system of control for an electrical drive comprising, a motor, a main generator having its armature winding connected in loop circuit with said motor, excitation means for said main generator, stepless controller means, first and second individual amplifying channels, said first and second ampliyfying channels being selectively rendered conductive in accordance with the position of the stepless controller to cause the excitation means of said generator to be energized in accordance with the output of the conducting amplifying channel, means to determine the output of the conducting amplifying channel in accordance with the voltage of the main generator, and the position of said stepless controller means and means to render the other amplifying channel conductive in response to and by an amount determined by the current above a preselected value in the armature circuit of said motor to alter the energization of said excitation means.

10. In a control system for an electric drive, the combination of a motor, a main generator having its armature winding connected in loop circuit with said motor, excitation means for said main generator, an exciter generator connected to determine the magnitude and sense of the excitation of the excitation means for the main generator, excitation means for said exciter generator, stepless controller means, and means for determining the magnitude of the excitation of the excitation means for said exciter generator in accordance with the main generator voltage, a reference signal, and the current above a preselected value in the motor armature circuit, and to determine the sense of the excitation of the excitation means for said main generator in accordance with the position of said stepless controller means.

11. A system of control for an electrical drive comprising, a motor, a main generator having its armature winding connected in loop circuit with said motor, excitation means for said main generator, stepless controller means; first and second individual amplifying channels, said first and second individual amplifying channels each comprising at least one individual magnetic amplifier, each of said individual magnetic amplifiers having individual main windings, individual reference control windings, indvidual voltage control windings and individual current limit control windings, said individual main windings being connected to receive a supply voltage, said individual voltage control windings being connected to receive a voltage which is a function of the main generator voltage, said individual current limit control windings being connected to be energized in accordance with the current in said motor armature above a preselected magnitude, and said individual reference control windings being adapted to be selectively energized in accordance with the position of said stepless controller to cause the magnetic amplifier channels to be selectively conductive and the excitation means of said generator to be energized in accordance with the output of the conducting magnetic amplifier channel.

12. In a control system for an electric drive, the combination of a motor, a main generator having its armature winding connected in loop circuit with said motor, excitation means for said main generator, an exciter generator connected to determine the magnitude and sense of the excitation of the excitation means for the main generator, first, second, and third excitation means for said exciter generator; stepless controller means; first and second individual amplifying channels, said first and second individual amplifying channels each comprising at least one individual magnetic amplifier, each of said individual magnetic amplifiers having individual main windings, individual reference control windings, individual voltage control windings, and individual current limit control windings, said individual main windings being connected to receive a supply voltage, said individual voltage control windings being connected to receive a voltage which is a function of the main generator voltage, said individual current limit control windings being connected to be energized in accordance with the current in said motor armature above a preselected magnitude, and said individual reference control windings being adapted to be selectively energized in accordance with the position of said stepless controller to cause the magnetic amplifier channels to be selectively conductive, said first and second excitation means being connected to receive the output of said first and second amplifying channels respectively, and said third excitation means being connected to receive an excitation which is determined by the voltage across the main generator when said stepless controller is in a position to render both of said magnetic amplifiers non-conductive.

13. In a system of control for an electrical drive the combination of a motor; a main generator having its armature winding connected in loop circuit with said motor; excitation means for said main generator; stepless controller means comprising, a base, a shaft rotatably mounted on said base, at least one cam member coupled to be rotated by said shaft, contact members operatively associated with said cam member to have their condition determined by the position of said shaft, an inductor having a stator and a rotor, said rotor being coupled to be rotated by said shaft to vary the magnetic coupling between the rotor and stator, actuating means rotatable about an axis perpendicular to the axis of said shaft, and means operatively associated with said actuating means and said shaft for translating the rotary motion of said actuating means into rotary motion of said shaft; magnetic amplifier means; means to determine the magnitude and sense of excitation of the excitation means for said main generator in accordance with the magnitude and sense of the output of said magnetic amplifier means, means to determine the magnitude of the output of said magnetic amplifier means in accordance with the main generator voltage, the current in the armature circuit of said motor above a preselected value, and the relative positions of the rotor and stator of said inductor, and means to determine the sense of the output of said magnetic amplifier means determined by the condition of said contact members.

14. In a system of control for an electrical drive the combination of a motor; a main generator having its armature winding connected in loop circuit with said motor; excitation means for said main generator; stepless controller means comprising, a base, a shaft rotatably mounted on said base, at least one cam member coupled to be rotated by said shaft, contact members operatively associated with said cam member to have their condition determined by the position of said shaft, an inductor having a stator and a rotor, said rotor being coupled to be rotated by said shaft to vary the magnetic coupling between the rotor and stator, actuating means rotatable about an axis perpendicular to the axis of said shaft, and means operatively associated with said actuating means and said shaft for translating the rotary motion of said actuating means into rotary motion of said shaft; first and second individual amplifying channels, said first and second amplifying channels being selectively rendered conductive as determined by the condition of said contact means to cause the excitation means of said generator to be energized in accordance with the conducting amplifying channel; means to determine the output of the conducting amplifying channel in accordance with the voltage of the main generator, and the position of the inductor rotor with respect to its stator; and means to render the other amplifying channel conductive in response to and by an amount determined by the current above a preselected value in the armature circuit of said motor to alter the energization of said excitation means.

15. In a control system for an electric drive, the combination of a motor, a main generator having its armature winding connected in loop circuit with said motor, excitation means for said main generator, an exciter generator connected to determine the magnitude and sense of the excitation of the excitation means for the main generator, excitation means for said exciter generator, excitation means for said main generator; stepless controller means comprising, a base, a shaft rotatably mounted on said base, at least one cam member coupled to be rotated by said shaft, contact members operatively associated with said cam member to have their condition determined by the position of said shaft, an inductor having a stator and a rotor, said rotor being coupled to be rotated by said shaft to vary the magnetic coupling between the rotor and stator, actuating means rotatable about an axis perpendicular to the axis of said shaft, and means operatively associated with said actuating means and said shaft for translating the rotary motion of said actuating means into rotary motion of said shaft; first and second individual magnetic amplifier channels, said first and second individual magnetic amplifier channels being selectively rendered conductive in accordance with the condition of said contact members to cause the excitation means of said exciter generator to be energized in accordance with the output of the conducting, magnetic amplifier channel; and means to determine the output of the conducting magnetic amplifier channel in accordance with the voltage of the main generator; and the relative position of the inductor rotor and stator, and means to render the other magnetic amplifier channel conductive in response to and by an amount determined by the current above a preselected value in the armature circuit of said motor to alter the energization of said excitation means.

16. In a control system for an electric drive, the combination of a motor, a main generator having its armature winding connected in loop circuit with said motor; excitation means for said main generator, an exciter generator connected to determine the magnitude and sense of the excitation of the excitation means for the main generator, excitation means for said exciter generator, excitation means for said main generator; stepless controller means comprising, a base, a shaft rotatably mounted on said base, at least one cam member coupled to be rotated by said shaft, contact members operatively associated with said cam member to have their condition determined by the position of said shaft, an inductor having a stator and a rotor, said rotor being coupled to be rotated by said shaft to vary the magnetic coupling between the rotor and stator, actuating means rotatable about an axis perpendicular to the axis of said shaft, and means operatively associated with said actuating means and said shaft for translating the rotary motion of said actuating means into rotary motion of said shaft; first and second individual amplifying channels, said first and second individual amplifying channels each comprising at least one individual magnetic amplifier, each of said individual magnetic amplifiers having individual main windings, individual reference control windings, individual voltage control windings, and individual current limit control windings, said individual main windings being connected to receive a supply voltage, said individual voltage control windings being connected to receive a voltage which is a function of the main generator voltage, said individual current limit control windings being connected to be energized in accordance with the current in said motor armature above a preselected magnitude, and said individual reference control windings being adapted to be selectively energized as determined by the condition of said contact members and of a magnitude determined by the relative position of said inductor rotor and stator to cause the magnetic amplifier channels to be selectively conductive and the excitation means of said exciter generator to be energized in accordance with the output of the conducting magnetic amplifier channel.

17. In a control system for an electric drive, the combination of a motor, a main generator having its armature winding connected in loop circuit with said motor, excitation means for said main generator, an excited generator connected to determine the magnitude and sense of the excitation of the excitation means for the main generator, first, second, and third excitation means for said exciter generator; excitation means for said main generator; stepless controller means comprising, a base, a shaft rotatably mounted on said base, at least one cam member coupled to be rotated by said shaft, contact members operatively associated with said cam member to have their condition determined by the position of said shaft, an inductor having a stator and a rotor, said rotor being coupled to be rotated by said shaft to vary the magnetic coupling between the rotor and stator, actuating means rotatable about an axis perpendicular to the axis of said shaft, and means operatively associated with said actuating means and said shaft for translating the rotary motion of said actuating means into rotary motion of said shaft; and first and second individual magnetic amplifier channels, said first magnetic amplifier channel having its output connected to determine the excitation of said first excitation means, said second magnetic amplifier channel being connected to determine the excitation of said second excitation means, said first and second magnetic amplifier channels being connected to be selectively rendered conductive in accordance with the condition of said contact members, means to determine the output of the conducting magnetic amplifier channel in accordance with the voltage of the main generator and the relative positions of the rotor and stator of said inductor and means to render the other magnetic amplifier channel conductive in response to and by an amount determined by the current above a preselected value in the armature circuit of said motor to alter the energization of the excitation means of said exciter generator; said third excitation means being connected to receive an excitation determined by the voltage across the main generator when the controller is in the position to render both of said magnetic amplifiers non-conductive.

18. In a system of control for an electrical drive the combination of a motor; a main generator having its armature winding connected in loop circuit with said motor; excitation means for said main generator; stepless controller means comprising, a base, a shaft rotatably mounted on said base, at least one cam member coupled to be rotated by said shaft, contact members operatively associated with said cam member to have their condition determined by the position of said shaft, a first bevel gear connected to said shaft, actuating means rotatable about an axis perpendicular to the axis of said shaft, a second bevel gear connected to be rotated by said actuating means, a housing member adapted to engage said base member and enclose said first and second bevel gears, said first and second bevel gears meshing with each other to translate rotary motion of said actuating means into rotary motion of said shaft to cause the contact members to be operated, an inductor having a stator and a rotor, said rotor being coupled to be rotated by said shaft to vary the magnetic coupling between said rotor and stator; magnetic amplifier means; means to determine the magnitude and sense of excitation of the excitation means for said main generator in accordance with the magnitude and sense of the output of said magnetic amplifier means, means to determine the magnitude of the output of said magnetic amplifier means in accordance with the main generator voltage, the current in the armature circuit of said motor above a preselected value, and the relative positions of the rotor and stator of said inductor, and means to determine the sense of the output of said magnetic amplifier means determined by the condition of said contact members.

19. In a system of control for an electrical drive the combination of a motor; a main generator having its armature winding connected in loop circuit with said motor; excitation means for said main generator; stepless controller means comprising, a base, a shaft rotatably mounted on said base at least one cam member coupled to be rotated by said shaft, contact members operatively associated with said cam member to have their condition determined by the position of said shaft, a first bevel gear connected to said shaft, actuating means rotatable about an axis perpendicular to the axis of said shaft, a second bevel gear connected to be rotated by said actuating means, a housing member adapted to engage said base member and enclose said first and second bevel gears, said first and second bevel gears meshing with each other to translate rotary motion of said actuating means into rotary motion of said shaft to cause the contact members to be operated, an inductor having a stator and a rotor, said rotor being coupled to be rotated by said shaft to vary the magnetic coupling between said rotor and stator; first and second individual amplifying channels, said first and second amplifying channels being selectively rendered conductive as determined by the condition of said contact means to cause the excitation means of said generator to be energized in accordance with the conducting amplifying channel; means to determine the output of the conducting amplifying channel in accordance with the voltage of the main generator, and the position of the inductor rotor with respect to its stator, and means to render the other amplifying channel conductive in response to and by an amount determined by the current above a preselected value in the armature circuit of said motor to alter the energization of said excitation means.

20. In a control system for an electric drive, the combination of a motor, a main generator having its armature winding connected in loop circuit with said motor, excitation means for said main generator, an exciter generator connected to determine the magnitude and sense of the excitation of the excitation means for the main generator, first, second, and third excitation means for said exciter generator; excitation means for said main generator; stepless controller means comprising, a base, a shaft rotatably mounted on said base, at least one cam member coupled to be rotated by said shaft, contact members operatively associated with said cam member to have their condition determined by the position of said shaft, a first bevel gear connected to said shaft, actuating means rotatable about an axis perpendicular to the axis of said shaft, a second bevel gear connected to be rotated by said actuating means, a housing member adapted to engage said base member and enclose said first and second bevel gears, said first and second bevel gears meshing with each other to translate rotary motion of said actuating means into rotary motion of said shaft to cause the contact members to be operated, an inductor having a stator and a rotor, said rotor being coupled to be rotated by said shaft to vary the magnetic coupling between said rotor and stator; and first and second individual magnetic amplifier channels, said first magnetic amplifier channel having its output connected to determine the excitation of said first excitation means, said second magnetic amplifier channel being connected to determine the excitation of said second excitation means, said first and second magnetic amplifier channels being connected to be selectively rendered conductive in accordance with the condition of said contact members, means to determine the output of the conducting magnetic amplifier channel in accordance with the voltage of the main generator and the relative positions of the rotor and stator of said inductor and means to render the other magnetic amplifier channel conductive in response to and by an amount determined by the current above a preselected value in the armature circuit of said motor to alter the energization of the excitation means of said exciter generator; said third excitation means being connected to receive an excitation determined by the voltage across the main generator when the controller is in the position to render both of said magnetic amplifiers non-conductive.

References Cited in the file of this patent

UNITED STATES PATENTS

| | | |
|---|---|---|
| 2,398,007 | Hunter | Apr. 9, 1946 |
| 2,420,449 | Somes | May 13, 1947 |
| 2,519,339 | Avery | Aug. 22, 1950 |
| 2,629,846 | Montgomery | Feb. 24, 1953 |
| 2,693,563 | Hunt | Nov. 2, 1954 |